Sept. 19, 1944.                B. SASSEN                    2,358,479
                            ROTARY SLIDE RULE
                          Filed Jan. 23, 1942              6 Sheets-Sheet 1
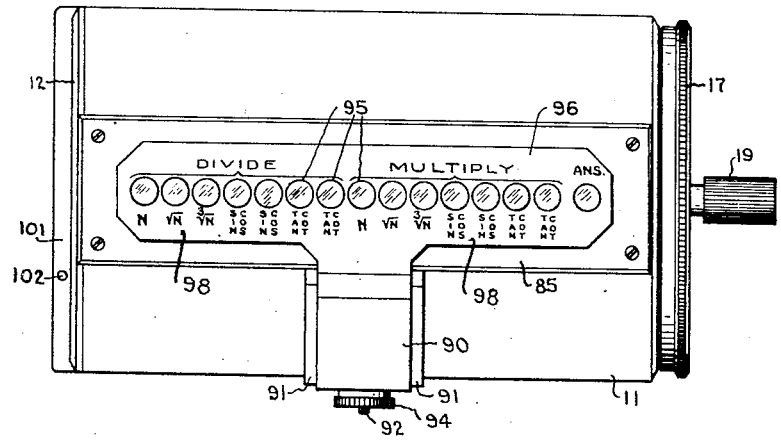
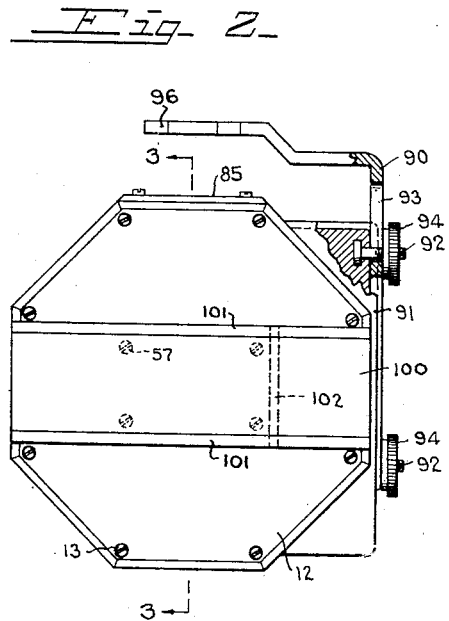
INVENTOR.
BERNARD SASSEN.
BY
*H.C. Kavel.*
ATTORNEY.

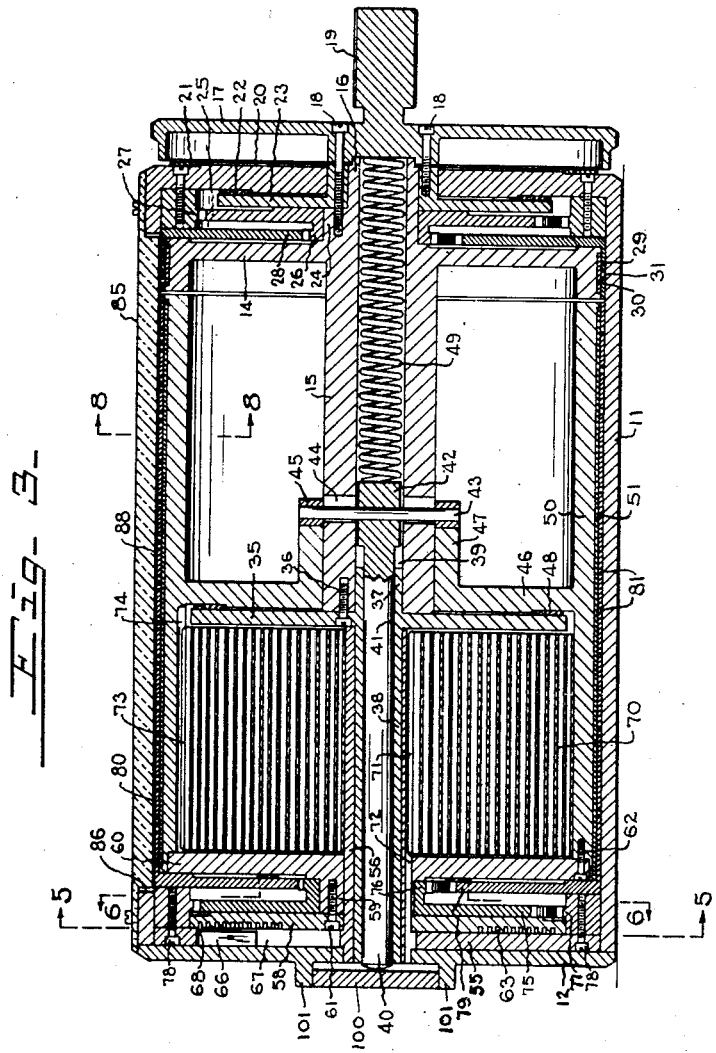

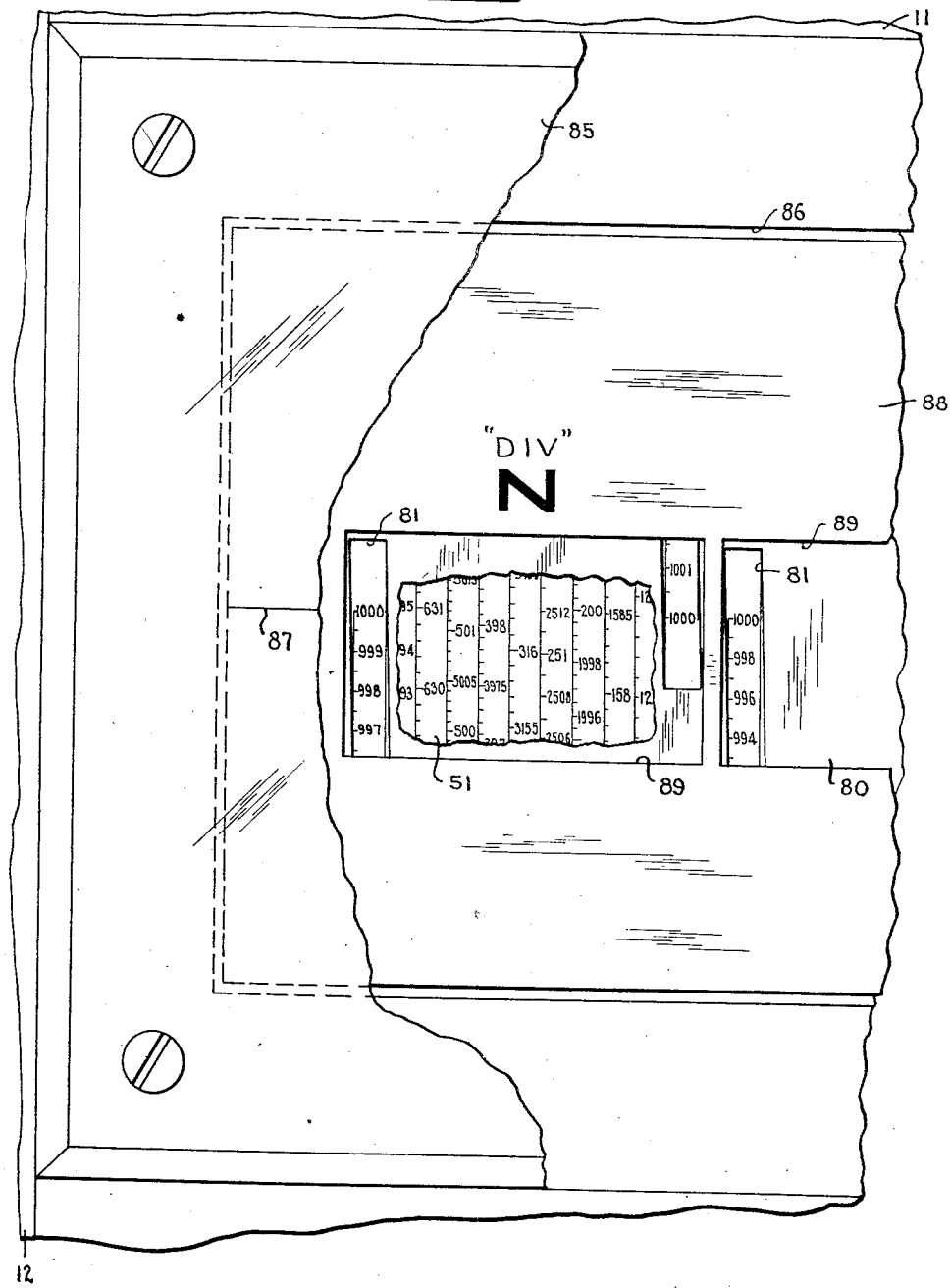

Sept. 19, 1944.                B. SASSEN                    2,358,479
                            ROTARY SLIDE RULE
                         Filed Jan. 23, 1942          6 Sheets-Sheet 4

INVENTOR.
BERNARD SASSEN.
BY
*H. C. Karel.*
ATTORNEY.

Sept. 19, 1944.  B. SASSEN  2,358,479
ROTARY SLIDE RULE
Filed Jan. 23, 1942  6 Sheets-Sheet 5
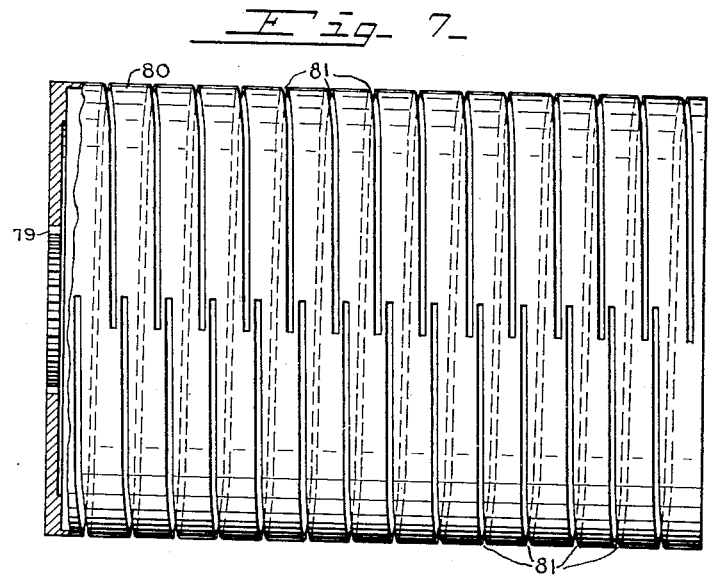
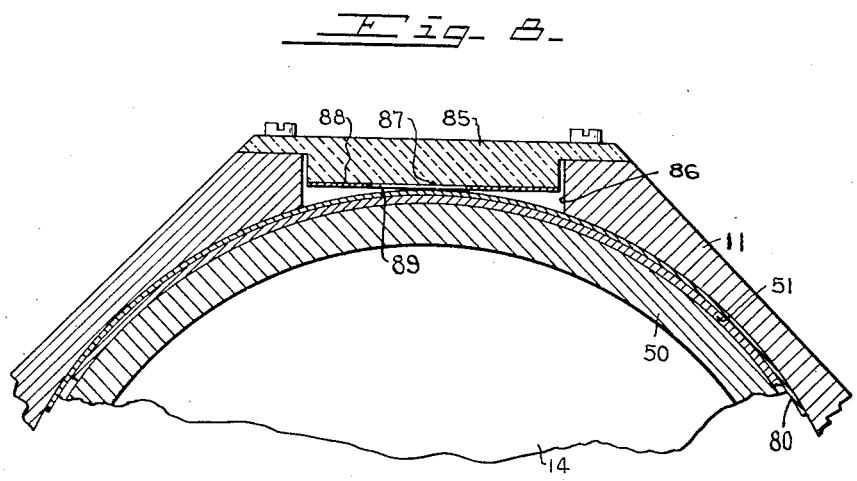
INVENTOR.
BERNARD SASSEN.
BY
*H.C. Karel.*
ATTORNEY.

Sept. 19, 1944.   B. SASSEN   2,358,479
ROTARY SLIDE RULE
Filed Jan. 23, 1942   6 Sheets-Sheet 6
_Fig. 9_
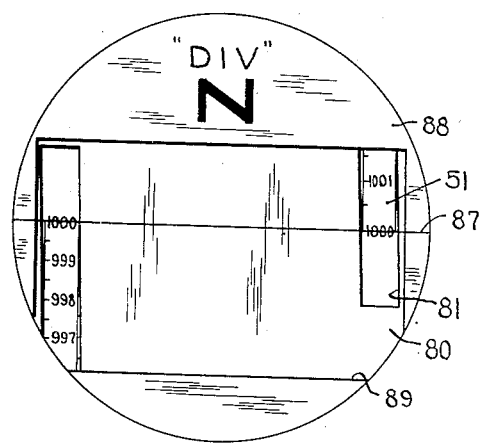
_Fig. 10_
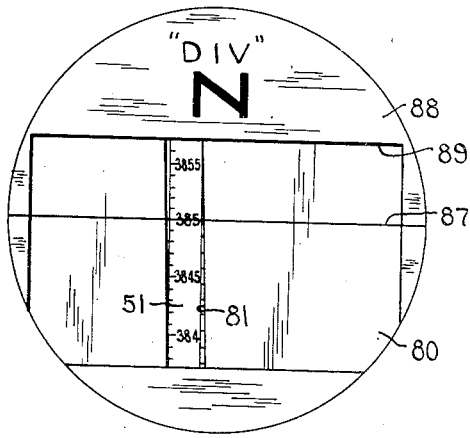
INVENTOR.
BERNARD SASSEN.
BY
ATTORNEY.

Patented Sept. 19, 1944

2,358,479

UNITED STATES PATENT OFFICE 2,358,479

ROTARY SLIDE RULE

Bernard Sassen, Springfield, Vt.

Application January 23, 1942, Serial No. 427,849

10 Claims. (Cl. 235—79.5)

This invention relates to a rotary slide rule for quickly and accurately determining the multiplication and/or division of a plurality of various figures through the process of rotating a hand knob and operating a trip lever.

In the usual slide rule it is difficult to obtain a correct answer due to the fact that it is often necessary to transfer figures from one side of the rule to the other side to complete a given calculation together with a movement of the cursor along the scale when more than two values are involved in the calculation, with the resultant difficulty of accurately setting the scales and cursor to obtain the answer which very often must be estimated. In the present invention the cursor is on a fixed window of a housing in which scales revolve by means of a rotary movement of a hand knob under tension permitting a quick and accurate setting of the scales. In all other slide rules whether straight-line or rotary, in order to multiply or divide by a series of values it is necessary to position one of the scales to unity and then to position either the cursor or one of the scales to the desired factor or divisor. In my improved device the positioning to unity is accomplished automatically merely by pressing a release lever. The operation of the device is confined to the repetition of two simple operations for completing any calculation within the scope of the scales, namely; rotating a hand knob and depressing a trip lever.

In the usual slide rule, when multiplying and/or dividing more than two numbers, there are two fine-setting operations needed for each subsequent number: (1) the bringing of unity on the sliding scale to the cursor, and (2) the bringing of the cursor to the succeeding factor or divisor. Since in making such calculations, it is this fine-positioning that consumes the greatest part of the time in completing calculations, the use of almost instantaneous and automatic means to effect one of these two fine-setting operations, namely; the bringing of unity on the sliding scale to the cursor, the total time for the entire calculation may be virtually halved when several factors or divisors are involved. Furthermore, since the accuracy of the final answer depends to a large extent on the accuracy with which each positioning operation is performed, this automatic and therefore completely accurate means for performing one-half of the total number of settings may be said to halve the possibility of total error.

Furthermore, the invention contemplates the use of microscopic scales each extending helically for several turns around scale-carrying members with shields in association therewith provided with openings arranged to register with a portion of the scale and having a timed movement in relation to the movement of the scale-carrying members whereby the openings in the shields will be in the correct position to expose only that portion of the scale which it is desired to read. In the embodiment shown in the drawings, it is contemplated to dispose the microscopic scales helically around the members ten times, thereby providing scales of great length which permits the use of a large number of digits opposite the calibrations, thereby increasing the accuracy of the device ten times, and yet confining it to a small and portable instrument. The advantages inherent in the use of microscopic scales are to increase the effective or apparent length of the scale without increasing the actual physical magnitude and the ability of having a large number of scales in the instrument confined within a narrow band, thus reducing the field and permitting the use of microscopes with great magnification.

The object is to provide rotatable scales in association with a hair-line, a movable shield and an opaque mask, said mask and shield provided with openings or windows forming frames movable transversely across the scales to permit a minute portion of the scales to be visible adjacent to the hair-line.

A further object of my invention is to provide a pair of rotatable members capable of being rotated a given number of revolutions and having a correlated actuation through the medium of a hand knob in opposition to retracting means imposed on one of the members, with means for disengaging said members from each other and thus permitting said retracting means to return the released member to unit position while retaining the other member in set position.

A further object is to provide scales disposed helically around the periphery of cylinders for several turns, and to surround these scales with opaque tubes or shields provided with single helical slots or transparent windows for each scale of the same width as the scales but having a helical advance per revolution, or lead, as many times greater as that of the scales, as there are turns for each complete scale, and to provide geared or positive timed movement between the scale cylinders and the shields to cause the shields to make one revolution while the scale cylinders make as many revolutions as there are turns for each scale around the cylinders, thereby progressively exposing to view a portion of each scale as it is revolved, throughout its entire length.

A further object is to provide a rotary slide rule with microscopic scales and individual microscopes for each scale adjustable to the focal requirements of the user.

My invention will be further readily understood from the following description and claims, and from the drawings in which latter:

Fig. 1 is a plan view of the device.

Fig. 2 is an end view of the same, partly in section.

Fig. 3 is a vertical longitudinal cross-section of the same, taken in the plane of the line 3—3 of Fig. 2.

Fig. 4 is an enlarged plan view of a portion of the window.

Fig. 7 is a detail plan view of the rotatable shield, partly in section.

Fig. 8 is an enlarged detail section, taken in the plane of the line 8—8 of Fig. 3, and;

Figs. 9 and 10 are enlarged views of the division numbers scale, as viewed through the lens.

Figure 5:
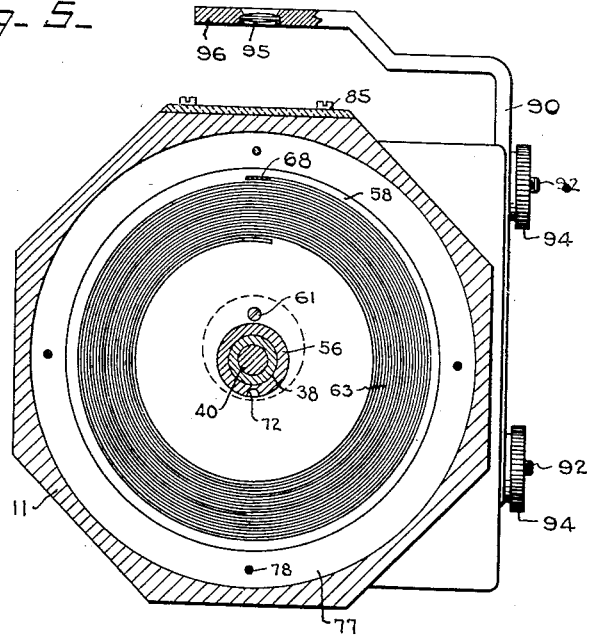
Fig. 5 is a vertical cross-section, taken in the plane of the line 5—5 of Fig. 3.
Figure 6:
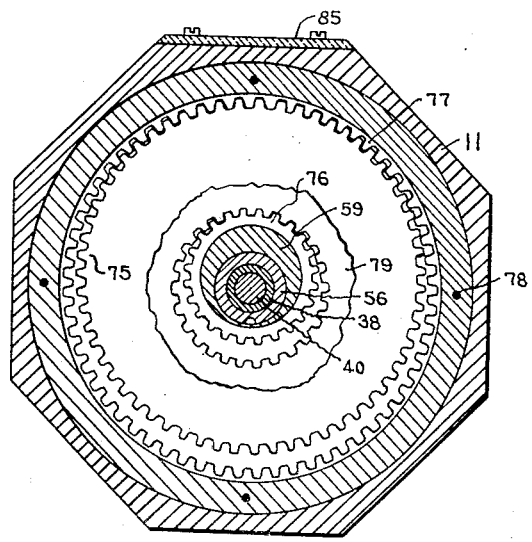
Fig. 6 is a vertical cross-section, taken in the plane of the irregular line 6—6 of Fig. 3.

The various scales of all slide rules start with the numeral 1 and reference to unit position or unity as herein set forth refers to the position of the scales whereby the numeral 1 on the scale will coincide with the cursor.

My improved device comprises a casing 11 having a cover 12 attached thereto as by screws 13. A rotatable member 14 has extending hubs 15 and 16. The hub 16 is journalled in the casing 11 and has a hand knob 17 secured thereto as by screws 18. A small hand knob 19 is attached to the hand knob 17 to facilitate rapid rotation of the rotatable member to a given position, whereafter the large hand knob may be used for fine-setting operations. A spring washer 20 is interposed between the hub 16 and the hand knob 17 creating a pressure against a friction ring 21 secured to the outer face of the casing. A second friction ring 22 is secured to the inner face of the casing and creates a frictional resistance between the casing and the rotatable member 14, through the medium of a disc 23 secured to the member 14.

The hub 16 of the member 14 has an eccentric portion 24 about which a pair of integral gears 25 and 26 revolve, meshing respectively with ring gears 27 and 28. The gear 27 is fixed to the casing, while the gear 28 extends from a circumferential shield 29 which covers the answer scale 30 secured to the member 14. With this arrangement of gears, rotation of the member 14 causes the gears to rotate within the fixed gear, thus causing the shield to revolve at a slower speed than the member 14, which in the present exemplification is of the order of one to ten. The shield 29 has a single helical slot 31 extending around the periphery, with the ends of the slot overlapping.

A disc 35 is secured to the hub 15 as by screws 36 and has extending hubs 37 and 38. The hub 37 extends into the bore 39 of the hub 15. A trip pin 40 is movable endwise in a bore 41 in the hubs 37 and 38, and is provided with an enlarged head 42 slidable in the bore 39. A pin 43 is carried by and extends transversely through the enlarged head of the trip pin, through an enlarged transverse aperture 44 in the hub 15, with the ends of the pin 43 secured in a collar 45 slidable on the outer periphery of the hub 15.

A rotatable member 46 has a hub 47 rotatable about the hub 15 being positioned between the disc 35 and the collar 45. A friction ring 48 is secured to the member 46 for driving the member 46 through frictional contact with the disc 35, being urged into contact by a coil spring 49 positioned in the bore 39 between the head of the pin 40 and the hand knob 17. The disc 35 is rotated by the hand knob in unison with the member 14. The rotatable member 46 has an elongated rim 50 on which a ring 51 is suitably secured, said ring having various scales inscribed thereon.

Positioned within the cover 12 is a disc 55 having a hub 56 in which the hub 38 of the disc 35 revolves. The disc 55 is suitably secured to the cover as by screws 57 to retain the disc and hub stationary in respect to the casing. A disc 58 is secured to the eccentric hub 59 of a closure plate 60 as by screws 61. The plate 60 is secured to the rim 50 of the rotatable member 46 as by screws 62. The disc 58 is provided with a spiral groove 63 having a given number of revolutions which in the present exemplification is ten. A key 66 rides in a slot 67 in the disc 58 and has a lug 68 riding in the spiral groove for limiting the number of revolutions that the rotatable member 46 may make. The key also acts as a stop to limit the reverse movement of the rotatable member 46. A spiral spring 70 has one of its ends 71 secured in an aperture 72 in the stationary hub 56 and the other end 73 engaged in an aperture 74 in the rim of the rotatable member 46. This spiral spring urges the member 46 to unity position.

The answer scale 30 has its values indicia arranged helically around the scale to the extent of ten revolutions. Likewise, the scale 51 which carries a plurality of scales representing values of numbers, square root, cube root, sines, cosines, tangents and cotangents, for both multiplication and division, with each of the respective indicia of each scale helically disposed around the scale to the extent of ten revolutions.

Mounted on the eccentric hub 59 is a pair of integral gears 75 and 76. The gear 75 meshes with a fixed ring gear 77 secured to the stationary disc 55 as by screws 78. The smaller gear 76 meshes with a gear 79 extending from a cylindrical shield 80 which extends over the scales 51 and is rotatable between the scales and the casing. This arrangement of epicyclic gearing causes the shield to rotate at a reduced speed in respect to the movement of the scales. The shield is provided with a slot 81 in the form of a helix for each of the scales. Each of the scales extends around the cylinder ten times, therefore the lead or advance per revolution of the slot in the shield will be ten times as great as the lead of the scales, and the timed relation between the scale cylinders and the sheld is ten to one. In this manner the slots in the shield will advance axially at the same rate as the scales on the cylinders and thus expose successively only a portion of the scales as they are rotated throughout the entire length of the scales. Thus as the members are rotated, the helical slots will move across the scale to expose only one row of figures on each scale in timed relation to the movement of the rotatable members.

If desired the shields 29 and 80 may be made of transparent material, with all portions except that comparable to the slots 31 and 81 covered with an opaque coating.

A window 85 is secured to the top of the casing and projects into an elongated slot 86 therein. A hair-line 87 is marked on the lower face of the window and extends transversely across the window. A mask 88 is secured to the lower face of the window, being provided with openings 89 to permit only a small portion of the scales to be visible adjacent to the hair-line. This mask may also have legends thereon for further identification of the respective scales.

An arm 90 is slidable in the side of the casing between ribs 91, being secured to the casing as by means of studs 92 extending from the casing through elongated slots 93 in the arm. Nuts 94 are provided for locking the arm to the casing. This arm carries a plurality of lenses 95 suitably held in the cross-bar 96 of the arm with each lens registering with a given scale. The elongated slots in the arm permits adjustment of the lenses to the focal requirements of the user and also permits retraction of the lens arm when the device is not in use. Suitable legends 98 inscribed on the arm adjacent to each lens designates the scale that can be viewed through each lens.

A trip lever 100 is positioned between a pair of ribs 101 extending from the cover and supported on a pivot pin 102 fixed in the ribs 101. Applying pressure to the lever 100 moves the trip pin 40 inwardly releasing the frictional contact between the disc 35 and the member 46 to cause a release of the member 46 from its driving connection with the member 14 permitting the spiral spring 70 to return the member 46 to unity.

In the operation of my improved device, multiplication and/or division can be quickly and accurately accomplished through the procedure of rotating the hand knob to the desired figure or value on any of the multiplication or division scales, which manipulation of the hand knob causes both the answer and the multiplication and division scales to rotate in unison to the given value. Pressing inwardly on the trip lever releases the friction drive between the members 14 and 46 and the spiral spring 70 automatically returns the member 46 to unity, while the answer scale remains in its set position, being held by the friction discs 21 and 22. It will be noted, see Fig. 4, which shows a portion of one of the fifteen scales on the device, that the scales which are arranged on a helix, encircle the scale carriers ten times in the present exemplification, although this number may be varied without departing from the basis of my invention. With the scales of microscopic size, a great number of divisions can be recorded thereon, permitting extremely accurate reading of the scales, and the combination of the fixed mask and the helical slots in the shielding cylinders operating in a definite relation to the movement of the scales permits the user to view only that portion of the scale having the correct value thereon, which enhances the accuracy of the device and prevents confusion in reading the scales.

In Figs. 9 and 10, I have shown the "N" scale for division as it appears viewed through the lens. Fig. 9 shows the scale set at unity, at which time both ends of the scale are visible through the helical slot 81 in the shield 80, however, as soon as the hand knob, which is always rotated in a clockwise direction in making calculations, is rotated one end of the scale will disappear, and the slot in the shield will move progressively across the scale, being synchronized with the scales through the epicyclic gearing to maintain the slot in the shield in registry with the scale at the cursor. As shown in Fig. 10 the scale has been revolved to bring the number 385 into alignment with the hair-line, with all other numbers shielded from view, with the exception of those numbers adjacent to 385.

It will be noted that each of the helical scales encircle the scale carriers ten times, while the slots in the shields form a little more than one complete helical turn with a lead ten times as great as the lead of the scales, therefore due to the gear ratio of ten to one, as the scales revolve the slots in the shields will move progressively across the scales at the hair-line to expose only that portion of the scales registering in fixed relation with the slots. Without the shields the operator would have to make a selection from ten answers, but with the shields only the correct answer is visible.

Assuming it is desired to multiply $6 \times \sin 12° 10' \times 8$, the operator looks through the answer lens and rotates the hand knob to bring the number 6 on that particular scale into alignment with the hair-line. The trip lever is then depressed to release the multiplication and division scales and permit the spring 70 to automatically return the multiplication and division scales to unity position, while the answer scales remains in its set position. The operator will then peer through the lens having the legend "SIN" adjacent thereto, on the multiplication scale, rotate the hand knob to bring the line indicating 120° 10' in alignment with the hair-line, depress the trip lever to permit the multiplication and division scales to again return to unity, release the trip lever and rotate the hand knob to bring the figure 8 on the multiplication number scale in alignment with the hair-line. The number now appearing on the answer scale in alignment with the cursor is the product of this multiplication. Inasmuch as the answer scale does not return to unity automatically, any calculation involving a whole number can be started by bringing such number on the answer scale in alignment with the hair-line, but in cases where there is no whole number in the equation and only involving other figures such as square root, cube root, sines, cosines, tangents and cotangents, it is necessary to bring the answer scale to unity before starting the calculation.

From the foregoing it will be seen that I have devised a compact, efficient slide rule, capable of extreme accuracy, with a minimum number of steps necessary to complete any given calculation. By means of the magnification of the scales, the scales can be accurately set in relation to the hair-line, and with the use of the mask and shields, a framed opening is formed which moves automatically along the scales adjacent to the hair-line, preventing all possibility of reading the wrong portion of the scale. Therefore making the device simple to operate and requiring no special instructions, but merely the simple process of turning the hand knob to bring the proper number or indicated figure on either of the scales into registration with the hair-line, depressing the trip lever for automatically returning the multiplication and division scales to unit position, and repeating this same procedure to complete the calculation, and then moving the eye to the microscope above the answer scale and reading the answer.

While I have described various mathematical scales, primarily useful to mechanical engineers and the like, it will be readily understood that comparable scales for other purposes may be substituted for the type of scales described or scales with a greater or less number of helical turns, within the scope of the appended claims. The scales on this device are similar to the scales shown and described in my co-pending application, filed January 23, 1942, Serial No. 427,848, with the exception that each scale is ten times greater in length, being arranged helically around the cylinder.

Having thus fully described my invention, what I claim as new and desire to secure by Letters Patent, is:

1. In a rotary slide rule, a casing, a first disc in said casing, a hand knob outside said casing fastened to the disc and adapted to rotate it, a window in the casing bearing a mark, a scale carried by said disc in alignment with the window and having adjacent rows of indicia, a second disc in said casing, a scale carried by the second disc in alignment with the window and also having adjacent rows of indicia, shields through which only one row of indicia of each scale is visible at a time, means responsive to said knob for variably moving said shields, a normally operated spring-pressed coupling between the two discs, a motor spring in the casing for the second disc, and a pin projecting to the outside of the casing and forming part of the coupling between the two discs.

2. The rotary slide rule according to claim 1, and in which the shields are rotatable between the scales and the window, and gearing for coupling each shield to the knob.

3. The rotary slide rule according to claim 1, and in which the second disc is provided with a spiral groove having overlapping ends and the same number of revolutions as the number of rows of indicia in the scale, and a stop fixed to the casing and projecting in the groove.

4. The rotary slide rule according to claim 1, in which the shields are rotatably mounted between the scales and the window, and epicyclic gearing connecting each disc with the shield for the scale carried thereby to rotate the shield with the disc but at a lower speed than the scale.

5. In a rotary slide rule, a casing, a first disc in said casing having an enlarged rim, a hand knob outside of said casing fastened to the disc, a window in the casing, a scale spiralling around the rim of said disc in a plurality of revolutions in alignment with the window, a shield between said scale and window and through which only one row of indicia on the scale is visible at a time, gearing controlled by said knob for displacing said shield with respect to the scale, a second disc in said casing rotatable with the first disc, the second disc also having an enlarged rim, a plurality of scales, each spiralling around the rim of the second disc in a plurality of revolutions in alignment with the window, a second shield between the last-mentioned scales and the window and through which only one row of indicia is visible at a time in each scale, gearing controlled by the second disc for displacing the second shield with respect to the scales with which it cooperates, a motor spring for the second disc in said casing, a spring-pressed coupling between said discs, and a pin projecting to the outside of the casing for actuating said coupling.

6. In a rotary slide rule, a casing, a first disc in said casing having an enlarged rim, a hub projecting from the disc to the outside of said casing, a hand knob fastened to the hub, a window in the casing bearing a mark, a scale spiralling around the rim of said disc in a plurality of revolutions in alignment with the window, a shield between said scale and window, a gearing controlled by said knob for rotating said shield, a second disc in said casing rotatable with the first disc, the second disc also having an enlarged rim, a plurality of scales, each spiralling in said plurality of revolutions around the rim of the second disc in alignment with the window, a second shield between the last-mentioned scales and the window, a gearing controlled by the second disc for rotating the second shield, the first shield having one and the second a plurality of spiral slots, one for each of the co-operating scales, the relationship and gearing being such that the slots expose successively only one row of indicia on the scales, a motor spring for the second disc in said casing, a spring-pressed coupling between the discs, and a pin projecting to the outside of the casing for releasing said coupling to uncouple said discs.

7. In a rotary slide rule, a casing, a first disc in said casing having an enlarged rim, a hub projecting from the disc to the outside and a hub projecting to the inside of said casing, a hand knob fastened to the outside hub, a friction ring between the casing and the knob, a second disc between the casing and the first disc and fastened to the latter, a friction ring between the casing and the second disc, a window in the side wall, a scale attached to the rim of the first disc in alignment with the window and having indicia which are helically arranged in a plurality of revolutions, a pair of gears rotatably mounted on the outside hub, a first ring gear fixed to the casing engaging the first of said gears, a second ring gear engaging the second gear, a first shield covering said scale attached to the second ring gear and rotatable therewith, said shield having a helical slot, adapted to expose one row of indicia on the scale at a time, a third disc in said casing fastened to the inwardly projecting hub of the first disc and also provided with a hub, a fourth disc rotatably mounted on the inwardly projecting hub of the first disc between the first and third discs, the fourth disc having an enlarged rim aligned with the rim of the first disc, the last-mentioned rim bearing a plurality of scales in alignment with the window, each of said scales having indicia which are helically arranged in the same number of revolutions as on the first-mentioned scale, a friction ring fastened on the fourth disc and engaging the third disc near the periphery thereof, a key slidably mounted on the casing, a fifth disc fastened to the fourth disc and having a spiral groove with a plurality of revolutions, the same number as the number of revolutions in said scales, a lug projecting from said key into the groove in the fifth disc, a motor spring having one end fastened to the rim of the fourth disc and the other end to the casing, a pin projecting through the hubs of the first, third and fourth discs and the casing, a head for said pin, a coiled spring within the hub of the first disc, normally pressing the pin head into frictional engagement with the fourth disc, a spring-pressed lever mounted on the outside of the casing and adapted axially to displace the pin against the tension of the coiled spring to push the pin head out of engagement with the fourth disc, a pair of gears rotatable with the fourth disc, a third ring gear meshing with one and a fourth ring gear meshing with the other of the last-mentioned gears, the fourth ring gear being fastened to the casing, and a second shield covering the scales on the fourth disc attached to the fifth ring gear and rotatable therewith, said second shield being provided with a helical slot for each of the adjacent scales and adapted to expose one row of indicia on each scale at a time, the relationship being such that during the rotation of the two shields the slots therein will advance at the same rate as the scales on the rims and expose successively only a portion thereof in predetermined relation to the rotation of the first and fourth discs.

8. In a rotary slide rule, a casing having two parallel end walls and a polygonal side wall, a first disc in said casing adjacent one end wall and having an enlarged rim, a hub projecting from the disc through said one end wall to the outside and a hub projecting to the inside of said casing, a hand knob fastened to the outside hub adjacent said one end wall, a spring-pressed friction ring between the outer face of the end wall and the knob, a second disc between the end wall and the first disc and fastened to the latter, a friction ring between the inner face of said end wall and the second disc, a window in the side wall having an apertured mask bearing suitable legends, a hair line on said window, an answer scale attached to the rim of the first disc in alignment with the aperture and certain legend of the window mask, said answer scale having indicia which are helically arranged in a plurality of revolutions, the hub projecting to the outside having eccentric portion between the first and second discs, a pair of integral gears rotatably mounted on said eccentric portion, a first ring gear fixed to the casing engaging the first of said gears, a second ring gear engaging the second gear, a first shield covering said scale attached to the second ring gear and rotatable therewith, said shield having a helical slot, adapted to expose one row of indicia on the scale at a time, a third disc in said casing fastened to the inwardly projecting hub of the first disc and also provided with a hub, a fourth disc rotatably mounted on the inwardly projecting hub of the first disc between the first and third discs, the fourth disc having an enlarged rim aligned with the rim of the first disc, the last-mentioned rim bearing a plurality of scales in alignment with certain other legends on the mask and the aperture in the window, each of said scales having indicia which are helically arranged in the same number of revolutions as on the answer scale, a friction ring fastened on the fourth disc and engaging the third disc near the periphery thereof, a fifth disc in said casing fastened to the other end wall and having a hub surrounding the hub of the third disc, the fifth disc having a slot in which a key is slidably mounted, a plate fastened to and enclosing the edge of the rim of the fourth disc, a sixth disc fastened to said plate adjacent the fifth disc, said sixth disc having a spiral groove having overlapping ends and a plurality of revolutions, the same number as the number of revolutions in said scales, a lug projecting from said key into the groove in the sixth disc, a motor spring within a chamber formed by the fourth disc and the plate fastened to its edge, one end of said spring being fastened to the rim of the fourth and the other end to the hub of the fifth disc, a pin projecting through the hubs of the first, third and fourth discs and the other end wall to the outside of the casing, a head for said pin, a coiled spring within the hub of the first disc, normally pressing the pin head into frictional engagement with the fourth disc, a spring-pressed lever mounted on the outside of the other end wall and adapted axially to displace the pin against the tension of the coiled spring to press the pin head out of engagement with the fourth disc, the plate fastened to the rim of the fourth disc having an eccentric hub, a pair of integral gears carried by the last-mentioned hub, a third ring gear meshing with one and a fourth ring gear meshing with the other of the last-mentioned gears, the fourth ring gear being fastened to the fifth disc, a second shield covering the scales on the fourth disc attached to the fifth ring gear and rotatable therewith, said second shield being provided with a helical slot for each of the adjacent scales and adapted to expose one row of indicia on each scale at a time, the relationship being such that during the rotation of the two shields the slots therein will advance axially at the same rate as the scales on the rims and expose successively only a portion thereof in predetermined relation to the rotation of the first and fourth discs, an arm slidably mounted on the side wall of the casing in alignment with the window mask aperture, and a plurality of lenses carried by the arm, each in alignment with a different scale.

9. In a rotary slide rule, a casing having a window, a first disc in said casing carrying on its rim a scale visible through said window, said scale being arranged in an integral number of helical revolutions, a second disc in said casing carrying on its rim a plurality of scales visible through said window, each of said plurality of scales being arranged in the same integral number of helical revolutions as the scale on the first disc, a knob on the outside of the casing for rotating the first disc, a coupling between the two discs, a thin cylindrical mask between the scales on each disc and the aperture in the casing, each of said masks having a helical slot of a length corresponding to one helical revolution of the adjacent scale and a geared connection between each disc and its associated mask, the gear ratio being equal to the number of revolutions constituting one complete scale.

10. In a rotary slide rule, a casing having a window, a first disc in said casing carrying on its rim a scale visible through said window, said scale being arranged in an integral number of helical revolutions, a second disc in said casing carrying on its rim a plurality of scales visible through said window, each of said plurality of scales being arranged in the same integral number of helical revolutions as the scale on the first disc, a knob on the outside of the casing for rotating the first disc, a coupling between the two discs, a thin cylindrical mask between the scales on each disc and the aperture in the casing, each of said masks having a helical slot of a length corresponding to one helical revolution of the adjacent scale plus an overlap of the ends of the slot, and a geared connection between each disc and its associated mask, the gear ratio being equal to the number of revolutions constituting one complete scale.

BERNARD SASSEN.